United States Patent [19]
Geiger

[11] 3,891,964
[45] June 24, 1975

[54] TRUCK OR TRAILER AXLE OVERLOAD INDICATOR

[76] Inventor: Leo Franklin Geiger, 6803 Cherbourg Ave. North, Jacksonville, Fla. 32205

[22] Filed: July 15, 1974

[21] Appl. No.: 488,310

[52] U.S. Cl. .......................... 340/52 R; 200/85 R
[51] Int. Cl. ........................................ G08b 21/00
[58] Field of Search ........ 340/52 R, 272; 200/61.42, 200/61.44, 85 R

[56] References Cited
UNITED STATES PATENTS

| | | | |
|---|---|---|---|
| 2,769,967 | 11/1956 | Lukocevich | 340/52 R |
| 2,779,013 | 1/1957 | Chotro | 340/52 R |
| 2,996,697 | 8/1961 | Ellis et al. | 340/52 R |
| 3,646,512 | 2/1972 | Borgstede | 340/52 R |

*Primary Examiner*—Alvin H. Waring
*Attorney, Agent, or Firm*—Theodore D. Lindgren

[57] ABSTRACT

An axle overload indicator for trucks, tractors and trailers comprising: (a) an indicator assembly that suspends a flexible indicator over the midpoint of the center of the differential or axle housing and visually indicates an overloaded condition by contacting it, said indicator being so designed that it cannot damage the differential or axle housing by contact; (b) a transverse horizontal indicator mounting bracket that can be clamped to the longitudinal frame members of the vehicle and that supports the indicator assembly high enough above the axle to be monitored to avoid damaging it under the severest depression of the vehicle's springs; (c) an electrically actuated overload indicator light or buzzer, supplementary to the visual indicator, that functions whether the vehicle is at rest or in motion.

7 Claims, 5 Drawing Figures

PATENTED JUN 24 1975　　　SHEET 2　　　3,891,964

1

TRUCK OR TRAILER AXLE OVERLOAD INDICATOR

BACKGROUND OF THE INVENTION

This invention relates to an accessory for use with motor trucks and trailers for the purpose of indicating an overload condition.

Inventions by Moulton, U.S. Pat. No. 1,294,298, Petersen, U.S. Pat. No. 1,590,544 and Swartley, U.S. Pat. No. 1,689,978 relate to devices for indicating weight. Bonnette, U.S. Pat. No. 1,809,373 relates to a device for indication of an overload condition through visual registration of the depression of the springs of the vehicle.

The device of this invention is an improved axle overload indicator. In particular, the improved device of this invention is designed to prevent any possibility of damage to the differential or axle housing from contact with the indicator and to permit simple attachment to the frame of trucks and trailers of all models made by all manufacturers without modification of said trucks and trailers. More particularly, the overload indicator of this invention is designed with improved capability for retaining its calibration over long periods of hard usage. Still more particularly, the improved indicating device of this invention may be constructed to provide an electrical signal indicating overload of an axle, in addition to direct visual indication of overload condition.

SUMMARY OF INVENTION

The improved overload indicator of this invention comprises three novel features: (a) an indicator assembly that positions and suspends a flexible indicator over the midpoint of the center of the differential or axle housing of trucks, tractors or trailers and visually indicates an overload condition by contacting it when the vehicle is at rest or in motion, said indicator being so designed that it cannot damage the differential or axle housing by contact with it; (b) a transverse horizontal indicator mounting bracket that can be clamped at any accessible position along the longitudinal frame members of the vehicle and that supports the indicator assembly over the center of the axle to be monitored in a position high enough above it to avoid damaging the housing by contact with it under the severest depression of the vehicle's springs; (c) an electrically actuated overload indicator light or buzzer, supplementary to the visual indicator, which rejects spurious overload signals such as would occur when the springs on the moving vehicle are depressed by irregularities of the roadway but which functions whether the vehicle is at rest or in motion.

DETAILED DESCRIPTION OF INVENTION

Following are three embodiments of this invention.

Figure 1:
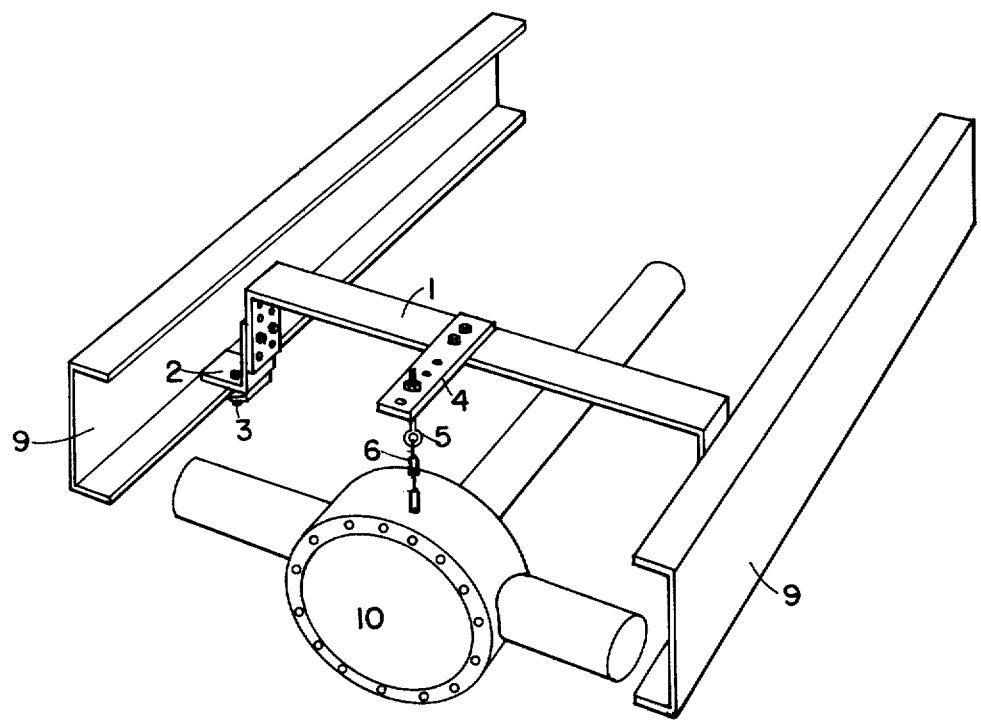
FIG. 1 shows schematically the axle overload indicator of this invention installed over the differential housing of a truck using a mounting bracket with two frame clamps and illustrating the use of a length of chain as a visual indicator of overload condition.
Figure 2:
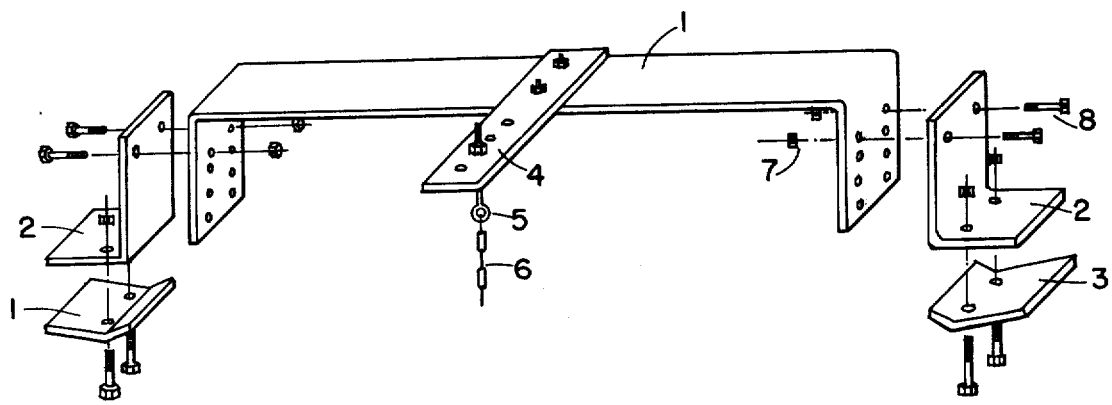
FIG. 2 is an exploded view of the overload indicator of FIG. 1.

A universally applicable embodiment of the axle overload indicator is shown in FIGS. 1 and 2. The device comprises two sub-assemblies, a mounting bracket assembly and an indicator assembly. The mounting bracket assembly consists of a horizontal beam 1 that extends transversely between the longitudinal frame members 9 of a truck or trailer with respective ends of the beam 1 bent at substantially right angles and adjustably attached to frame brackets 2 which combine with frame clamp plates 3 to fasten the assembly firmly in place on frame members 9. Nuts 7 and bolts 8 are used to attach the beam 1 to brackets 2 and brackets 2 to clamp plates 3. A plurality of pairs of holes are indicated for adjustment of the height of the beam 1 above the differential housing 10 and the adjustment range is twice the span of the pairs of holes because the assembly can be mounted in the upright position shown in FIG. 1 or it can be inverted.

The indicator assembly consists of an indicator support bar 4 which is rigidly attached to and which may extend either to the front or rear from the center of horizontal beam 1, said support bar 4 having a plurality of holes for mounting and positioning the indicator holder and adjustment bolt 5 so that it suspends flexible pendent indicator 6 such as a chain, cable or cord directly above the midpoint of the center of the differential housing 10.

Figure 3:
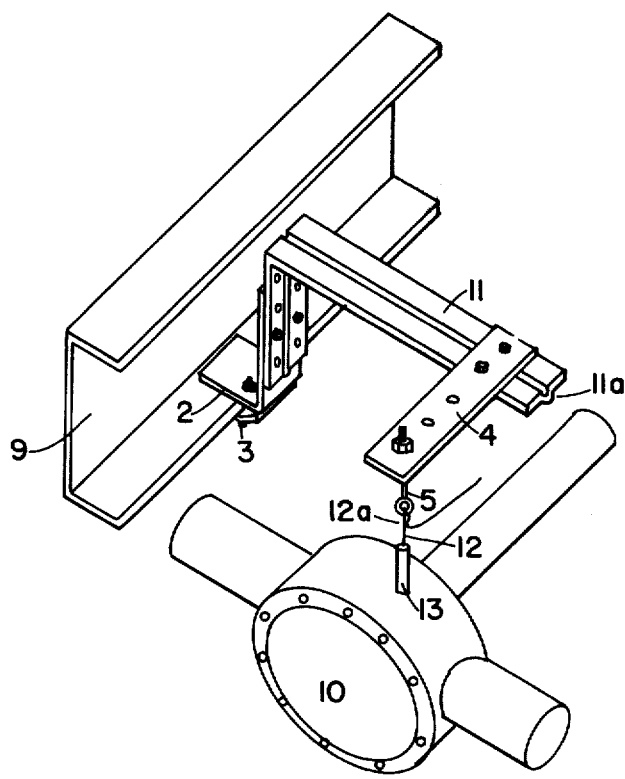
FIG. 3 shows schematically the axle overload indicator of this invention installed over the differential housing of a truck, using a mounting bracket held in place with only one frame clamp and illustrating the use of an electrically conducting, flexible cable as the indicator.

A second embodiment of the invention is illustrated in FIG. 3, wherein the mounting bracket assembly differs from its counterpart of FIGS. 1 and 2 in that one frame bracket 2 and one frame clamp 3 are omitted and the beam 11 has been stiffened by impressing an indentation 11a along its horizontal section, through the corner and along its vertical section.

Figure 4:
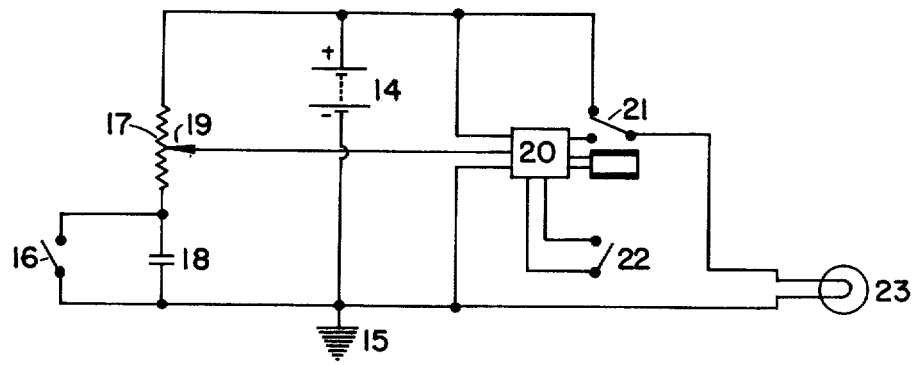
FIG. 4 is a diagram of circuit requirements for electrically signalling an overloaded axle, said circuit being applicable to either a stationary or a moving vehicle.

The indicator assembly of FIG. 3 is designed to actuate the time-delay relay 20 of FIG. 4 that switches on a signal light or buzzer 23, powered by the truck battery 14, as well as providing a direct visual indication of overloading. The indicator assembly consists of: An indicator support bar 4 on which is mounted an indicator holder and adjustment bolt 5 that suspends an insulated flexible indicator cable 12 which terminates in a metallic contact plug 13 to which it is connected electrically and mechanically. The components of the electric circuit are shown schematically in FIG. 4. The sensor components in the circuit of FIGS. 3 and 4 consist of: the truck battery 14 the negative terminal of which is grounded 15 to the major metallic parts of the vehicle including the differential housing 10; the indicator cable 12 and contact plug 13 which with the differential housing 10 comprises the signal switch 16; the current limiting resistor 17; the arc suppressing condenser 18; and a tap 19 on the resistor 17 that provides the sensor input to the time-delay relay 20. The time-delay relay 20 of FIG. 4, which is energized by the truck battery 14, requires a steady sensor input of one-fourth to three-fourths seconds duration to close the relay controlled switch 21 and activate the signal device 23. If controlled switch 21 is designed to latch in closed position, as through use of a latching relay, a reset switch 22 may be included in the circuit to open switch 21 and turn off signal 23.

Figure 5:
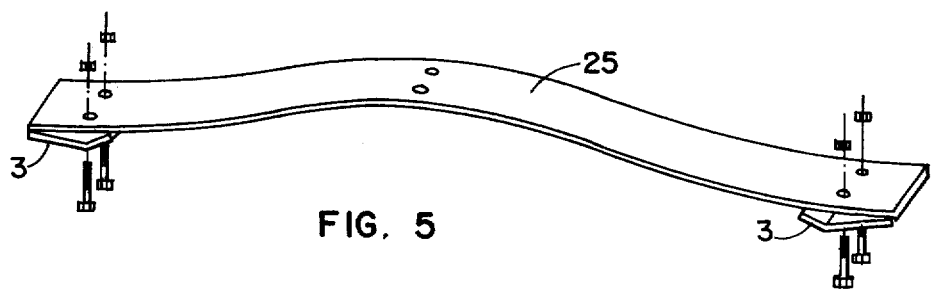
FIG. 5 shows an arched beam mounting bracket design that does not require frame brackets against which to secure the frame plate clamps.

A third embodiment of the invention is shown in FIG. 5. The horizontal beam 1 of FIGS. 1 and 2 may be replaced on certain trucks and trailers by the transverse arched beam 25 which functions satisfactorily wherever it can be installed and has the advantages of simplicity and lower cost. The ends of the arched beam 25 fit over the rails of the longitudinal frame members and are held in place by frame clamp plates 3 at each end which eliminates the need for two frame brackets 2.

Either of the indicator assemblies indicated in FIGS. 1 and 2 are applicable for use on the arched beam 25 described in the third embodiment.

MODE OF OPERATION OF THE INVENTION

The axle overload indicator may be calibrated as described below before it is used.

First the vehicle is placed on an accurate scale and loaded until the axle to which the indicator is fitted bears the desired maximum weight. The length of the indicator chain 6 or cable 12 is then adjusted so that its lower end hangs as close as possible to the differential housing 10 or axle housing without touching it.

If the indicator chain 6 is used, its length is approximately set by addition or removal of links and the final adjustment is made with the nuts 7 on indicator holder and adjustment bolt 5.

If the flexible indicator cable 12 and contact plug 13 are used, the length is approximately set by securing a loop through the head of the indicator holder and adjustment bolt 5 with a plastic cable strap 12a and making the final adjustment with the nuts 7 on the adjustment bolt 5.

After calibration, touching of the lowest link of the indicator chain 6 or cable contact plug 13 to the differential or axle housing indicates overloading of the axle.

The axle overload indicator can also be used as a guide for balancing or redistributing the load on trailers with movable axles.

Having described my invention, I claim:

1. An improvement in axle overload indicators for motor trucks and trailers, said improvement consisting of an adjustable height horizontal beam with ends bent at substantially right angles, attached by nuts and bolts at each end through one of a plurality of pairs of holes in each member, to a pair of frame brackets, each of said frame brackets attached by nuts and bolts to a truck or trailer frame clamp plate, an indicator support bar rigidly attached to and extending frontwardly or rearwardly from the center of said horizontal beam, an indicator holder and adjustment bolt passing through and affixed to one of a plurality of holes in said indicator support bar, a flexible pendent indicator attached to and suspended from said indicator holder and adjustment bolt, the lower end of said pendent indicator being positioned directly over and in close proximity to the center of the truck or trailer axle or differential housing.

2. The improvement of claim 1 wherein the flexible pendent indicator is an insulated flexible electrical cable 12 terminated at the lower end with a metallic contact plug in combination with a sensor circuit comprised of a battery, a current limiting resistor with tap, an arc supressing condensor, a time delay relay, and a signal device.

3. The improvement of claim 2 wherein the signal device is comprised of an electric light bulb.

4. The improvement of claim 2 wherein the signal device is comprised of an electrically activated buzzer.

5. The improvement of claim 2 wherein the time-delay relay latches in closed position and the sensor circuit includes a reset switch.

6. The improvement of claim 1 wherein one frame bracket and attached frame clamp are omitted and wherein the horizontal beam has a stiffening indentation impressed along its horizontal section, through the corner and along its vertical section.

7. The improvement of claim 1 wherein the horizontal beam and frame brackets are replaced by a arched beam mounting bracket.

* * * * *